(No Model.)

J. MEYER.
VENT BUNG AND BUSHING.

No. 433,015. Patented July 29, 1890.

Witnesses
Frank L. Millward
H. F. Murray

Inventor
John Meyer
By his Attorney
Geo. F. Murray

THE NORRIS PETERS CO., PHOTO-LITHO., WASHINGTON, D. C.

UNITED STATES PATENT OFFICE.

JOHN MEYER, OF COVINGTON, KENTUCKY.

VENT BUNG AND BUSHING.

SPECIFICATION forming part of Letters Patent No. 433,015, dated July 29, 1890.

Application filed August 23, 1889. Serial No. 321,787. (No model.)

*To all whom it may concern:*

Be it known that I, JOHN MEYER, a citizen of the United States, and a resident of Covington, in the county of Kenton and State of Kentucky, have invented certain new and useful Improvements in Vent Bungs and Bushings, of which the following is a specification.

My invention relates to bungs and vents, and is particularly intended for kegs and casks for beer, ale, and similar liquors, but is of course applicable to all vessels for storing liquids. Its object is to provide a vent-bung, which will at all times prevent the escape of gases from the vessel and preclude the admission of air, except when it is necessary to induce a flow of the liquid from the faucet of the vessel, which vent will require no attention after the keg is filled and vent-bung inserted until it again be necessary to fill the vessel.

I will first describe my invention, referring to the accompanying drawings, which illustrate it in a simple form, and will then point out definitely in the claims the improvements which I believe to be new and wish to protect by Letters Patent.

Figure 1:
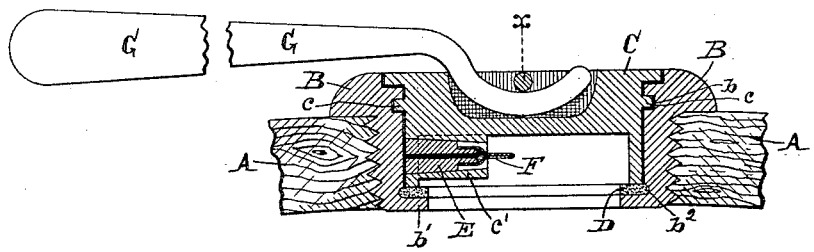
Figure 2:
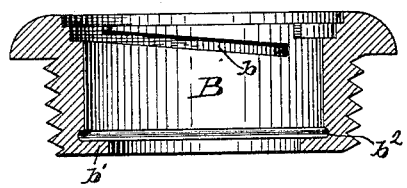
Figure 3:
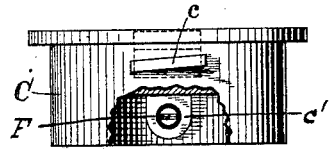
Figure 4:
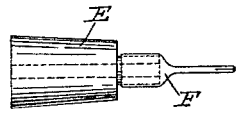

Figure 1 is a diametrical section of my bung and bushing applied to a beer-keg. Fig. 2 is a similar view of the bushing detached. Fig. 3 is a view in side elevation of the vent-bung, taken at a right angle to the view shown in Fig. 1, and with a portion of the wall broken away to expose the vent in end elevation. Fig. 4 is a longitudinal elevation of the vent detached, and drawn upon an enlarged scale.

Referring to the parts, which are indicated by similar reference-letters wherever they occur through the various views, A represents the bung-stave of an ordinary beer-keg, and B my bushing, which is screw-threaded exteriorly to fit into the bung-hole in the usual manner. In the interior of the bushing upon opposite sides are formed spirally-inclined grooves $b$, to receive spirally-inclined ribs $c$, which project from opposite sides of the bung C.

The lower part of the bushing B has an inwardly-projecting annular flange $b'$, and has also an annular groove $b^2$, to receive the rim of the packing ring or gasket D, which is preferably of rubber, and is for the purpose of seating the lower edge of the bung C, to form a tight joint between it and the flange of the bushing.

The bushing B and bung C are preferably made of cast malleable iron. The bung C, which is a cylindrical shell, has a boss $c'$ within its annular chamber at one side, which has a cone-shaped opening through it and the outer wall to receive the cone-shaped vent-plug E, which is preferably of wood and is axially perforated. The inner end of the plug E is reduced, and over the reduced end is stretched one end of the flattened rubber tube F. The opposite end of this tube, which may be open at its inner end or slotted upon one side to admit air to the keg through the vent-bore in plug E, projects through the end of the bore in boss $c'$ into the annular chamber within the bung C. The pressure of the gas within the keg will keep the inner end of the tube F closed so long as the pressure in the keg is greater than that of the atmosphere, even when the spigot is open; but so soon as the pressure is reduced below that of the atmospheric pressure sufficient air will enter the keg through the plug E and tube F to induce a flow of the liquid from the spigot.

I have selected a well-known form of vent-plug for my bung, and there are many other well-known forms which may be used with equal advantage—for instance, a strip or band of thin rubber may be drawn over the end of the plug, its ends lapping on the sides of the reduced portion and secured by a thread wrapped over it and around said reduced end; and there are also well-known metal check-valves that may be substituted for the one shown.

In the top of the bung C is a depression crossed by a bar X to receive the wrench or key G, by which the bung is tightened within the bushing or loosened therefrom and lifted out. The depression is like those in the ordinary stove-covers, and the key resembles the ordinary lifters; but the form is not material, so long as a means is provided to secure the bung in the bushing and remove it therefrom.

The bung is made to loosely fit the bushing, so that there is an air-space between their circular walls to supply the vent, the packing-ring D being relied upon to make a tight joint between the two.

When my vent-bung is used for beer or ale kegs, and it is desired to "pitch" or "repitch" the inside of the vessel, the bung C is removed and the opening in the bushing closed by an ordinary wooden bung, or in any other convenient manner.

I prefer to introduce the vent through the circular wall of the bung, as in such position it cannot be easily tampered with after the bung is inserted; but it would be only an inferior modification of my invention to introduce it through any portion of the top. In this case it is obvious that the packing-gasket may be omitted and a ground joint formed between the bung and bushing; but this would be more expensive and less reliable.

It will be seen that when the vessel is filled and my bung firmly secured in place there is no danger of leakage or the escape of gas, and there is no attention required from the user to properly vent the vessel.

I claim—

1. The combination of the bushing, the bung adapted to fit within it and having exterior projections to interlock with countergrooves in the bushing to secure the bung in place, the said bung being bored to receive a vent-plug, the vent-plug fitting said bore, and the inwardly-opening valve to control the bore in the vent-plug, the said bung when secured in place forming a close joint with the bushing below the exterior opening of the vent, substantially as specified.

2. The combination, substantially as hereinbefore set forth, of the bushing exteriorly threaded to engage the walls of the bung-hole, and provided with interiorly-inclined grooves, and the inwardly-projecting flange $b'$, the bung C, having spirally-inclined ribs to interlock with the grooves in the bushing, and the perforated boss $c'$, the perforated plug E, fitted in said perforated boss, the flattened tube F, secured over the inner end of the said plug and forming an inwardly-opening valve, and the packing-ring D, resting on the flange $b'$, forming when the bung is secured in place a tight joint between the bung and bushing below the entrance to the vent.

3. The combination of the bushing screw, threaded exteriorly, spirally grooved interiorly, and having the inwardly-projecting flange $b'$ and annular groove $b^2$, the bung C, having spiral ribs $c$ to interlock with the grooves in the bushing, and its lower edge adapted when locked to press the gasket D, which is seated in the groove $b^2$ and rests on the flange $b'$, and having the perforated radial boss $c'$ below its top, and a key-seat to receive the locking-wrench for tightening or removing the bung from the bushing, and the vent E F, passing through said perforated boss $e'$, substantially as and for the purpose set forth.

JOHN MEYER.

Witnesses:
 GEO. J. MURRAY,
 FRANK L. MILLWARD.